July 2, 1963

P. BILLOTTI ETAL 3,095,775

MULTI-BEAT INSTRUMENT

Filed Nov. 19, 1959

INVENTORS
PAUL BILLOTTI
LEONARD WERNER WEISS

By Richards & Geier

ATTORNEYS

July 2, 1963     P. BILLOTTI ETAL     3,095,775
MULTI-BEAT INSTRUMENT
Filed Nov. 19, 1959     4 Sheets-Sheet 2

INVENTORS
PAUL BILLOTTI
LEONARD WERNER WEISS
BY Richards & Geier
ATTORNEYS

July 2, 1963  P. BILLOTTI ETAL  3,095,775
MULTI-BEAT INSTRUMENT
Filed Nov. 19, 1959  4 Sheets-Sheet 3
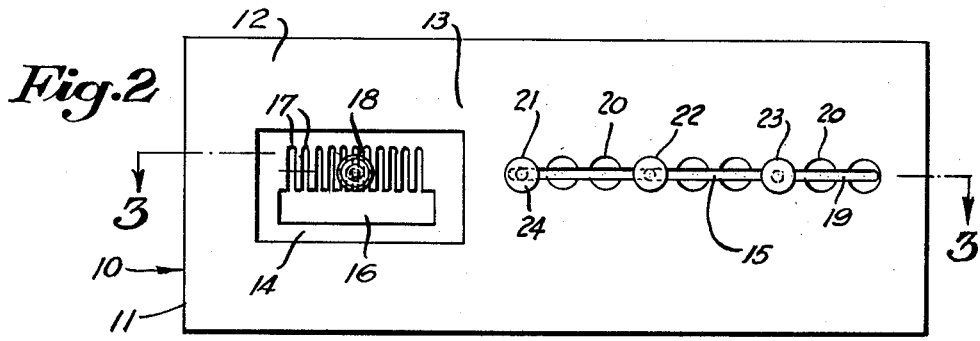
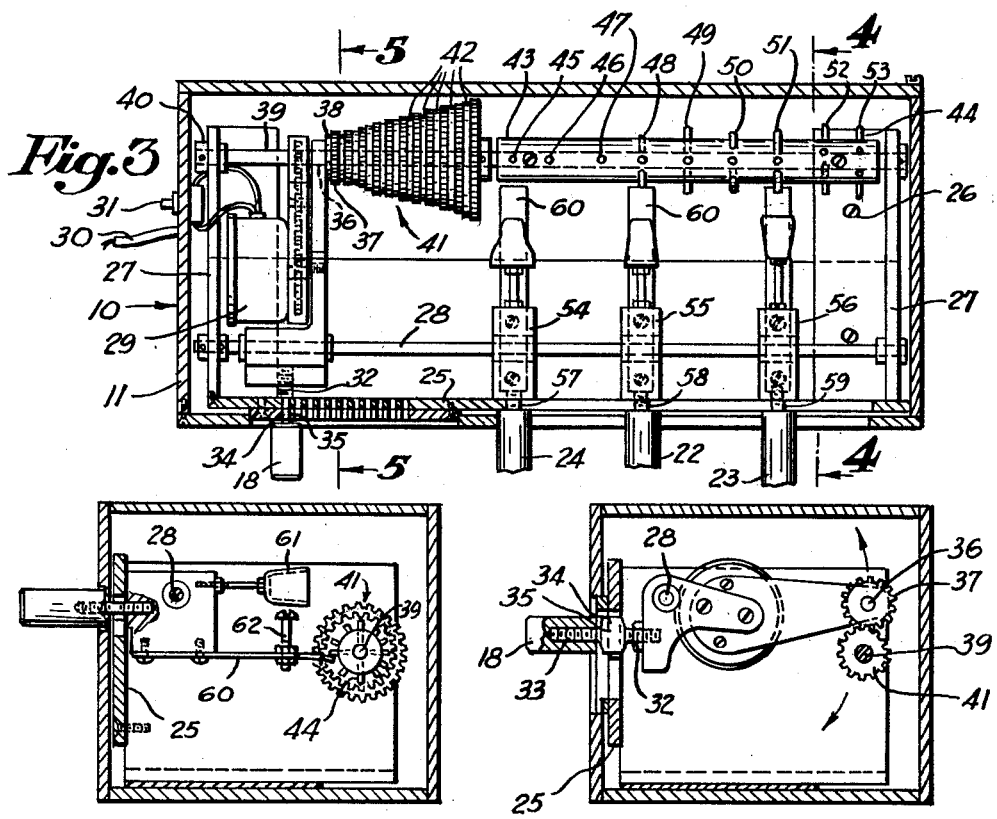
INVENTORS
PAUL BILLOTTI
LEONARD WERNER WEISS
BY
Richards & Geier
ATTORNEYS July 2, 1963 P. BILLOTTI ETAL 3,095,775
MULTI-BEAT INSTRUMENT
Filed Nov. 19, 1959 4 Sheets-Sheet 4

INVENTORS
PAUL BILLOTTI
LEONARD WERNER WEISS
BY
Richards & Geier
ATTORNEYS

United States Patent Office 3,095,775
Patented July 2, 1963

3,095,775
MULTI-BEAT INSTRUMENT
Paul Billotti, 881 7th Ave., New York, N.Y., and Leonard Werner Weiss, 68—04 52nd Drive, Maspeth, N.Y.
Filed Nov. 19, 1959, Ser. No. 854,116
6 Claims. (Cl. 84—484)

This invention relates to a multi-beat instrument, and refers more particularly to an instrument wherein a plurality of distinctive sounds is simultaneously emitted both at selected ratios and at selected rates of speed.

Some prior art beat devices emit only one beat, while those emitting more than one beat cannot vary the overall rate of speed of the beat except by having a variable speed shaft. Having a variable speed shaft requires complex variable speed motors and creates complex problems including those of increased weight and increased cost.

An object of the present invention is to provide a multi-beat instrument having controllable selected ratios of beats, and selected rates of speed of beats, without having the disadvantages of prior art.

Another object is to provide a selectively controlled multi-beat instrument having only a single speed driving shaft and, therefore, requiring only a simple single speed motor.

Another object is to provide a multi-beat instrument, wherein the motor is rotatable and translatable and in this manner effects engagement of the motor shaft with the beat producing mechanisms.

Another object is to provide a multi-beat instrument of light weight and compact construction.

A further object is to provide a multi-beat instrument which is easy and inexpensive to manufacture and assemble, and which is easily controlled and operated, and which gives a wide selection of ratios of beats and rate of speed of beats.

An even further object is to provide a multi-beat instrument suitable for use as a metronome in teaching musicians, dancers and singers.

Other objects of the present invention will become apparent in the course of the following specification.

The objects of the present invention may be realized through the provision of a multi-beat instrument comprising a motor unit which may be single-speed, and which can be rotated about an axis and also translated. Means are supplied connecting the motor shaft to a driven shaft, whereby the driven shaft may be rotated at a selected variable rate of speed without varying the speed of the motor shaft. The driven shaft comprises actuating members which actuate beat-producing elements to give a plurality of beats at selected ratios and selected rates of speed of beats, without changing the speed of rotation of the motor shaft.

The invention will appear more clearly from the following detailed description when taken in connection with the accompanying drawings showing, by way of example, preferred embodiments of the inventive idea.

In the drawing:

FIGURE 2 is a front view of a multi-beat instrument of the present invention;

FIGURE 3 is a partial cross-sectional view taken along line 3—3 of FIG. 2;

FIGURE 4 is a sectional view taken along lines 4—4 of FIG. 3;

FIGURE 5 is a sectional view taken along the line 5—5 of FIG. 3;

Figure 1A:
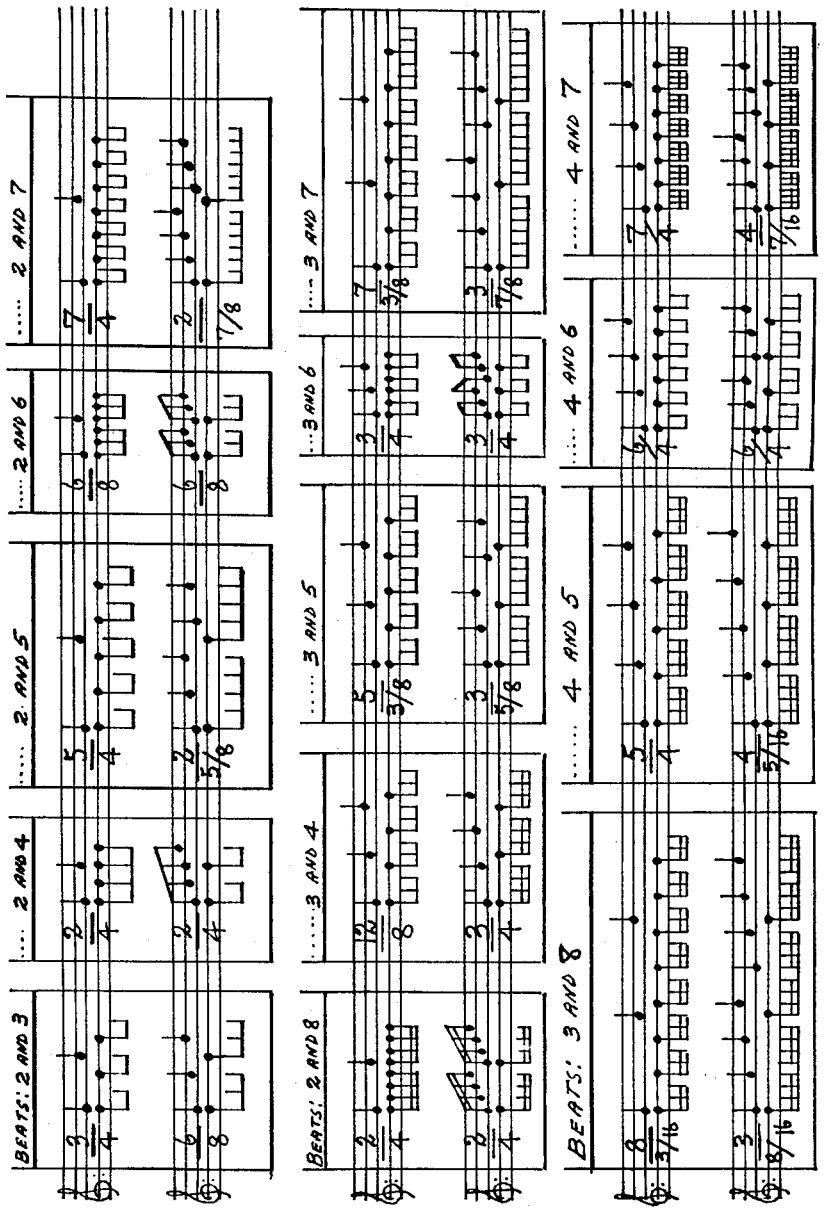
FIGURE 1a shows musical beat combinations obtainable by a multi-beat instrument of the present invention.
Figure 1B:
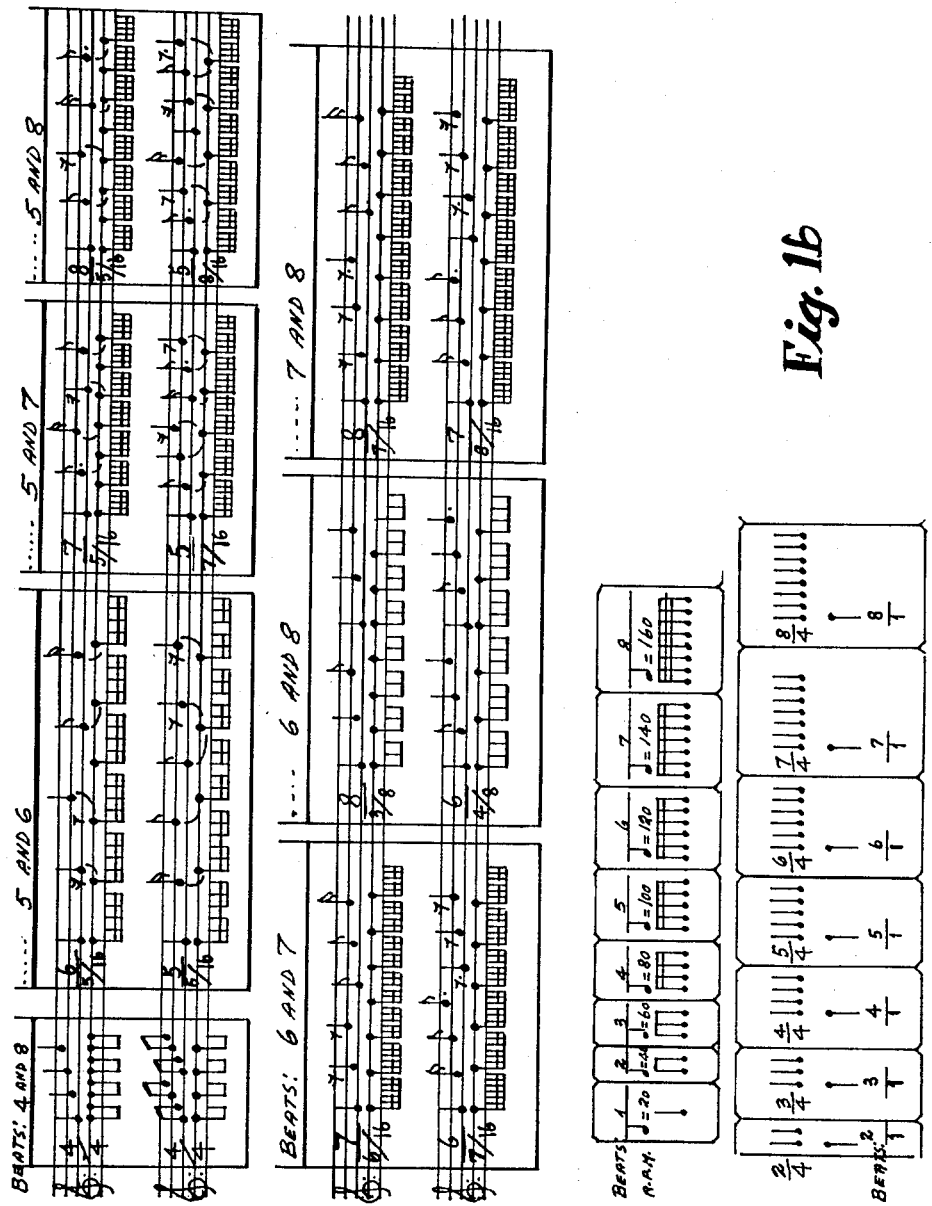
FIGURE 1b shows further musical beat combinations obtainable by a multi-beat instrument of the present invention.

Dancing, singing, or playing music, requires a good rhythmical sense, and the sense of hearing controls the hands, the feet, and the rhythmical body movements. The multi-beat instrument of the present invention will develop or improve the sense of hearing quickly and efficiently since rhythmical sense is a matter of diligent listening and concentration. Once the sense of hearing becomes rhythmically conscious, rapid progress in dancing, singing and playing music is assured, thus saving valuable time and money. FIGURES 1a and 1b show the various combinations of beats as occur in music and which can be achieved with the multi-beat instrument of the present invention. Examples include march-time (1-2) and waltz-time (1-2-3). With the present invention any of these beats may be easily achieved and the student or listener acquires a sense of rhythm which affects his entire disposition, both mental and physical. Any two combinations of beats can be combined to give different effects depending on how the beats are accented. Where a two-beat and three-beat timing is used, if the two beats are accented, the feeling of two triple beats usually indicated by the time signature $\%$ is achieved. If the three beats are accented the feeling of one triple beat with the middle beat split in two, which is usually indicated by a time signature $\frac{3}{4}$, is achieved. Likewise all the other examples in FIGURES 1a and 1b show how different timing effects can be produced. It is evident that any individual interested in developing his rhythmical sense can use the multi-beat instrument of the present invention in conjunction with his hands, feet, or any musical instrument to accomplish years and years of hard work in a very short time.

An individual musician or music student can learn to play in a band or orchestra through the use of the present invention, since the individual can play two beat-timing while listening to three beat-timing produced by the multi-beat instrument, and then can play three beats while listening to two beats. This is precisely what the individual must be able to do when playing in conjunction with other musicians. The individual can also play the two-beat timing at one time, and the student will eventually be able to play individual groups of 2, 3, or more beats. It should be noted that the majority of music students give up the study of music because they cannot master playing two beats against three beats, three beats against four beats, etc. The present invention allows the student easy access to such practice.

Dancing, both amateur and professional, requires a good rhythmical sense and the dancer's sense of hearing controls the feet and body movements. The present invention will develop and improve this sense of hearing quickly and efficiently, and once the sense of hearing becomes rhythmically conscious dancing progress is assured. The present invention may be used to simulate waltz time, fox-trot time, and other dance timings.

For an individual to be able to sing well, the ear and the mind must retain an exact impression of pitch and rhythm. Singers usually depend on their sense of hearing and their vocal chords for rhythm, and as a consequence they are subject to all kinds of interferences from the accompanying music and other singers in the group. It is not uncommon for a singer to sing two or four notes while the orchestra is playing three notes. The multi-beat instrument of the present invention will enable a singer to train himself to overcome these difficulties.

A front view of a multi-beat instrument 10 of the present invention is shown in FIGURE 2, wherein is shown a case 11 having a front face 12, comprising the control panel 13 which comprises a beat rate-of-speed control panel 14 and a beat-ratio-control panel 15. The rate-of-speed control panel 14 comprises a horizontally disposed neutral slot 16, a plurality of vertically disposed rate-of-speed selection slots 17 connected to the neutral slot 16. A rate-of-speed selection and control knob 18 is shown adjacent rate-of-speed control panel 14. The beat-ratio-control panel 15 comprises a horizontally disposed neutral slot 19, a plurality of ratio-selection recesses 20 connected to the neutral slot 19, and a beat synchronization recess 21 connected to neutral slot 19. A plurality of ratio selection and control knobs 22, 23, and a beat synchronization knob 24 are shown adjacent ratio-control panel 15.

A partial cross-sectional view of the multi-beat instrument 10 is shown in FIGURE 3, wherein is shown a base plate 25, connected to the case 11 by any suitable means such as screws 26, and which comprises vertical support portions 27. A cylindrical support rail 28 is rigidly supported by the support portions 27. An electric motor 29 is rotatably and slidably mounted on the rail 28 and is connected to a source of electricity by leads 30 and may be controlled by switch 31. It should be noted at this point that the motor 29 need not be a variable speed motor but may be a single speed motor of the simplest construction. Since the motor 29 may be single speed and simply constructed, it will be light-weight and, therefore, easily slidable along the rail 28 and also easily rotatable about the rail 28. As is shown in FIGURES 3 and 5, a connecting control arm 32 is connected to the motor 29 and extends through the rate-of-speed panel slots 16, 17. The outer end 33 of connecting arm 32 is threaded so as to receive the rate-of-speed selection and control knob 18, which is internally threaded so as to be able to travel axially along the connecting control arm 32. The control arm 32 has an intermediate portion 34 having flat sides 35. When the connecting arm 32 is moved upwardly into one of the rate-of-speed selection slots 17, the flat sides 35 engage the sides of slots 17 so that the control arm 32 and the motor 29 are fixed laterally and the motor 29 cannot move horizontally along the rail 28. If desired, the threads may be eliminated and the selection and control knob 18 may be connected to connecting control arm 32 by means of a spring which forces the control knob 18 against the control panel 14.

A motor shaft 36, which is driven by the motor 29 by any suitable transmission and coupling means (not shown), has mounted thereon a driver gear 37 and an adjacent disc guide member 38.

A driven shaft 39 is rotatably mounted in bearings 40 on support portions 27, and a plurality of driven gears 41 and a plurality of disc guide members 42 are mounted thereon. The gears 41 are of variable diameter, but have gear teeth such that they will all mesh with the gear teeth of driver gear 37. The use of disc guide members 38, 42 will be explained later in this specification. The gears 37, 41 may be oval-shaped or cam shaped, if desired, to give varying timing effects. A cylindrical actuator 43 is mounted on shaft 39 and has a plurality of actuating members 44, such as radially extending actuator arms, which are disposed annularly about the actuator 43 in longitudinally spaced series. Of course, the actuator members 44 may be connected directly to shaft 39. For purposes of describing the location of the actuator members 44, assume that we are looking at a transverse cross-section of the driven shaft 39 (see FIGURE 4), and that the uppermost longitudinal line of the driven shaft 39 is designated 0° (also 360°), and that the lowermost line of the driven shaft 39 is designated 180°, and that all intermediate points would have the proper geometric degree designation. Then the first annular series 45 of actuator members 44 (which is known as the synchronization series) would have one actuator member 44 locacated at 0°. Thus when a synchronization sound means is in position to be engaged by the series 45 of members 44, each revolution of shaft 39 would cause one beat of the synchronization sound. The remaining annular series are designated beat series and would have actuator members 44 located as indicated below, and would give the following number of beats per revolution of shaft 39 when a sounding device is properly located with respect to that particular series:

Series 46, member at 0°, one beat per revolution;
Series 47, members at 0°, 180°, two beats per revolution;
Series 48, members at 0°, 120°, 240°, three beats per revolution;
Series 49, members at 0°, 90°, 180°, 270°, four beats per revolution;
Series 50, members at 0°, 72°, 144°, 216°, 288°, five beats per revolution;
Series 51, members at 0°, 60°, 120°, 180°, 240°, 300°, six beats per revolution;
Series 52, members approximately at 0°, 51°, 103°, 154°, 206°, 257°, 309°, seven beats per revolution;
Series 53, members at 0°, 45°, 90°, 135°, 180°, 225°, 270°, 315°, eight beats per revolution.

The members 44 of each series can be uniformly spaced about the shaft 39 or they may be non-uniformly disposed about the shaft to achieve any desired rhythmic effect. A plurality of sounding means 54, 55, 56 are movably disposed adjacent members 44. Connecting arms 57, 58, and 59 are connected with the sounding means 54, 55, 56, respectively, and pass through slot 19 and are connected, respectively, to beat synchronization knob 24 and ratio selection control knobs 22, 23. Arms 57, 58, 59 are externally threaded, and since knobs 22, 23, 24 are internally threaded, the knobs 22, 23, 24 may be traversed longitudinally on the arms 57, 58, 59. The knobs 22, 23, 24 may also be spring connected to arms 57, 58, 59. Each of the sounding means 54, 55, 56 comprises a contact arm 60, a signal-producing element 61 (such as a cup or ball having a distinctive sound) and a contact means 62 whereby movement of contact arm 60 actuates the signal producing element 61. The signal producing element 61 may be of any suitable type.

The manner of use and operation of the multi-beat instrument 10 is as follows: Assume, for purposes of explanation, that the rate-of-speed selection control knob 18 is in the neutral slot 16, that the ratio selection control knobs 22, 23 and beat synchronization knob 24 are all in slot 19, and that the leads 30 are connected to a source of electric power or batteries not shown. Since the knob 18 is connected to the motor 29, when it is moved horizontally in neutral slot 16, the motor 29 moves horizontally along rail 28. When the knob 18 is moved vertically in to one of the rate-of-speed selection slots 17, the motor 29, and consequently, gear 37, rotates in a vertical plane with rail 28 as the center of rotation. As the knob 18 is raised, the gear 37 moves downwardly in the vicinity of driven gears 41. When the knob 18 is in such a position that connecting control arm 32 is located in the upper portion of one of the rate-of-speed selection slots 17, the gear 37 is brought into gravitational engagement with one of the gears 41. The slots 17 are located with respect to the various gears 41 such that this selective engagement is guaranteed when the control arm 32 enters a selected slot 17. Then when the knob 18 is moved downwardly into the neutral slot 16, the motor 29 rotates about the rail 28 and gear 37 becomes disengaged from gear 41. Therefore, when the knob 18 is moved horizontally in neutral slot 16, the motor 29 and gear 37 are free to move horizontally. Since each of the gears 41 is of a different diameter and has a different number of peripheral gear teeth, engagement of gear 37 in a different gear 41 will rotate shaft 39 at a different rate of speed although shaft 36 will always rotate at the same rate. Therefore, motor 29 need only be a simple single-speed motor. Obviously, since each slot 17 corresponds to a different diameter gear 41, the rate of rotation of shaft 39 will be determined by the slot 17 into which the knob 18 and arm 32 are placed. Therefore, one of the initial steps in the operation of the instrument 10 is to place the knob 18 and arm 32 in the slot 17 corresponding to the rate of speed desired. When the knob 18 is in the neutral slot 16, the gear 37 is somewhat higher than the central horizontal axis of gears 41, so that gear 37 is free to move horizontally past gears 41. As knob 18 is raised into a selected slot 17, gear 37 is rotated downwardly into gravitational engagement with a corresponding gear 41. Of course, the engagement may also be had by connecting the gear 37 to a spring or other elastic device which will hold gear 37 in engagement with one of gears 41. To guarantee that the gears 41 and gear 37 will always engage to the proper optimum depth, disc-shaped guide members 38, 42 are placed on shafts 36, 39 adjacent to the gears. Thus gears 37, 41 will approach each other until the guide members 37, 42 make tangential contact. As shafts 36, 39 rotate, members 38, 42 will maintain their tangential contact and gears 37, 41 will engage to the proper depth. The optimum depth of engagement may also be achieved by varying the height of slots 17 so that moving the control knob 18 to the top of each slot 17 will cause the gear 37 to move downwardly a different amount, depending on the diameter of the corresponding gear 41. It should be noted that gears 37, 41 may be engaged or disengaged with the motor 29 running and shafts 36, 39 rotating. Both gears 37, 41 will lie in the same plane and be tangential at the time of engagement.

Motor 29 may be elastically mounted so that proper engagement may be made between gears 37, 41 even if shaft 39 should become bent.

Of course, as shaft 39 rotates, the actuator 43 also rotates. When the knobs 21, 22, 23 are not in contact with panel 15, there is no contact between actuator members 44 and contact arms 60, and thus no beat is produced. This is true since with the knobs 22, 23, 24 free from panel 15, the contact arms 60 of sounding means 54, 55, 56 are swung downwardly by gravity out of the path of actuator members 44. To achieve a beat, for example, the knob 22 may be rotated inwardly to contact panel 15 and thus causes the sounding element 55 to move flat against the rear surface of panel 15 which causes element 55 to move upwardly into the path of actuator members 44. Thus element 60 will come in intermittent contact with member 62 as the members 44 in a series come in intermittent contact with contact arm 60. Of course, the device may be so arranged that beat-element 61 will come into direct intermittent contact with the actuator members 44. To achieve a particular ratio of beats, arms 22 and 23 are moved to a proper position along slot 19 at a recess 20. Since each recess 20 corresponds to a different annular series of actuator members 44, and since the ratio of beats is determined by the number of actuator members 44 in each annular series, the position of arms 22, 23 determines the ratio of beats. It should be noted that since each annular series has an actuator member 44 located at 0° as indicated above, once during each revolution of shaft 39 the beats of the series will be in synchronization. If it is desired to have an additional indication of when this synchronization occurs, the beat synchronization knob is moved into recess 21, whereby an additional distinctive sound will be produced in synchronization with the other synchronized beats. When any of the knobs 22, 23, 24 are moved into recesses 20, 21 the contact arm 60 is disposed in the path of the corresponding annular series of actuator members 44, whereby contact arm 60 is moved so that the actuating means 62 causes beat-producing element 61 to emit a beat. The motor 29 and sounding means 54, 55, 56 may be locked in the operative position since knobs 18, 22, 23 and 24 are movable longitudinally on their respective connecting control arms 32, 58, 59, 57, and may be rotated on the control arms until they are locked against the control panel face, whereby movement of motor 29 or sounding means 54, 55, 56 is prevented. Numbers indicating the various speeds and beat ratios are inscribed on the panel 13.

Thus it may be seen that the instrument 10 may be used to give many different ratios of beats at many different speeds. The uses of this device are many, including timing the playing of musical instruments, timing dancing and singing, timing the proper setting of engines, timing chemical reactions and so forth.

One of the areas of novelty of the present invention lies in the fact that a single speed motor 29 is all that is required to give both a variable rate of beat and a variable ratio of beat. The location of actuator members 44 guarantees the synchronization of the multi-beats once during each revolution of the shaft 39. No prior art instrument can give a variable rate of simultaneous beats without having a variable speed drive shaft. It should further be noted that in the present invention no friction clutch or similar device in necessary.

The present invention may also be used to give selected ratios and speeds of intermittent lights as well as sounds.

Figure 6:
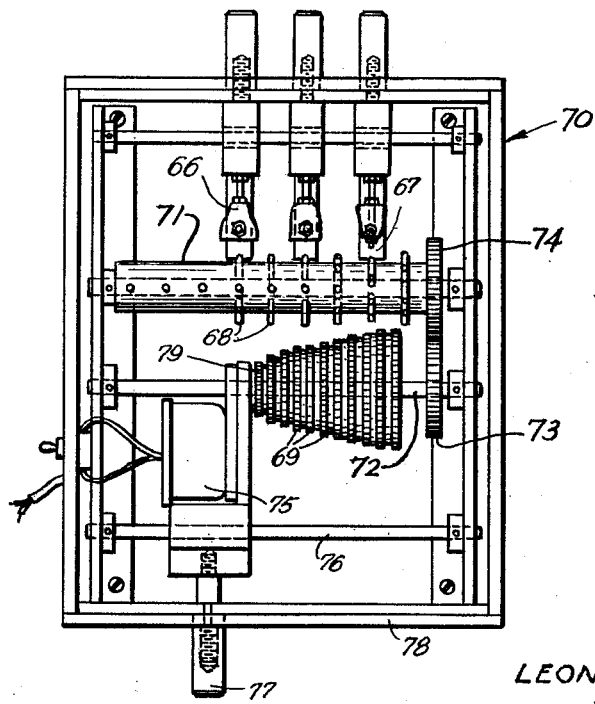
FIGURE 6 is a cross-sectional plan view of another embodiment of the present invention.

Another embodiment 70 of the present invention is shown in a cross-sectional plan view in FIG. 6, wherein the actuator 71 is parallel to the driven shaft 72. Gear 73 mounted on driven shaft 72 engages gear 74 mounted on actuator 71. An electric motor 75 is rotatably and slidably mounted on a rail 76 and is connected to a rate-of-speed selection and control knob 77 which extends out of the casing 78. The motor 75 drives a gear 79 through a suitable transmission (not shown). By moving the motor 75 along the rail 76 and swinging the motor up and down, the gear 79 can be brought into engagement with any one of the gears 69 keyed upon the shaft 72. The actuator 71 carries members or pins 68 adapted to actuate contact arms 67 which operate signal producing elements 66. Otherwise the operation and use of embodiment 70 is the same as the embodiment previously described. The embodiment 70, however, is considerably more compact than the other embodiment, and is more suitable for use where an easily transportable multi-beat instrument is desired.

Figure 7:
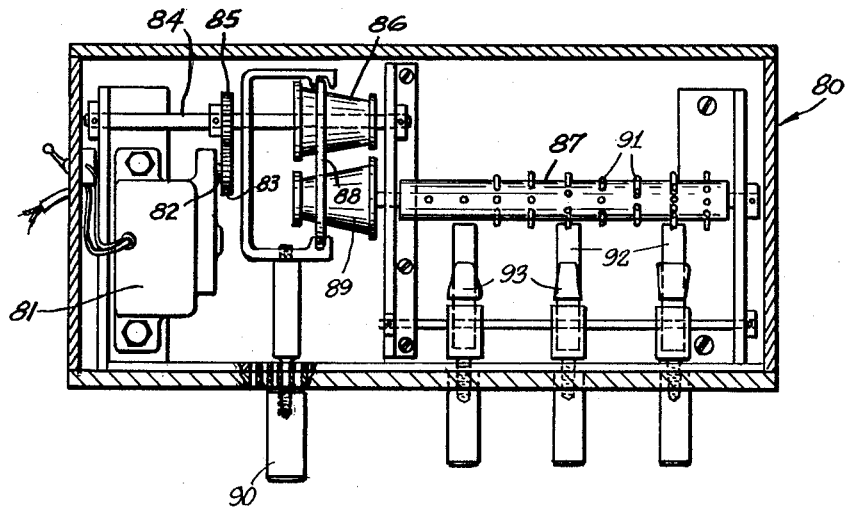
FIGURE 7 is a cross-sectional plan view of still another embodiment of the present invention.

An embodiment 80 of the present invention is shown in FIG. 7, wherein is shown a motor 81 which is fixed and which has a motor shaft 82 on which is mounted a driver gear 83. The shaft 82 is driven by the motor 81 through any suitable transmission (not shown). A rotatable shaft 84 has mounted thereon a gear 85 which engages driver gear 83 and whereby shaft 84 is rotated. Connecting means 86 are mounted on shaft 84 adjacent to actuator 87, and drive actuator 87 by any suitable friction clutch means 88 known in prior art. The actuator 87 is rotatable along with a cone 89. Since the connecting means 86 are also conical, it is apparent that the speed of the actuator 87 may be varied depending upon the position of the connecting means 86 which is set by the rate-of-speed selection and control knob 90. The actuator 87 carires members or pins 91 adapted to actuate contact arms 92 which operate signal producing elements 93. This particular embodiment allows the use of a fixed motor 81 which is single-speed while still achieving a variable speed actuator 87. The manner of operation and use of embodiment 80 is similar to that of the previously described embodiments.

Among the advantages of the multi-beat instrument of the present invention are the following: the instrument gives a plurality of simultaneous beats at selected variable ratios; the overall rate of speed of the beats may be selectively controlled; the ratio of beats and the rate of speed of beats may be accurately and absolutely controlled; the instrument requires only a single speed drive shaft and a single speed motor; the motor may be rotated and translated to give perfect engagement with a driven shaft; the disc-shaped guide members adjacent the engaging gears control the engagement of the gears so as to guarantee a uniform and optimum depth of engagement; the instrument is light-weight and compact;

the instrument is easy to operate; and is simple and inexpensive to manufacture and assemble.

It is apparent that the described example is capable of many variations and modifications within the scope of the present invention. All such variations and modifications are to be included within the scope of the present invention.

What is claimed is:

1. A multi-beat instrument, comprising a motor having a motor shaft, a rotatable driven shaft, means driven by said motor shaft for driving said driven shaft, engaging means mounted on said driven shaft for selectively engaging the first-mentioned means to rotate said driven shaft at various selected speeds, a plurality of beat-producing elements, actuating means connected to said driven shaft for actuating said beat-producing elements, and means for selectively placing said beat-producing elements in intermittent contact with at least one of said actuating means, whereby a selected ratio of simultaneous beats is obtained at selected rates of speed.

2. A multi-beat instrument, comprising a motor having a motor shaft, a driver gear driven by said motor shaft, a rotatable driven shaft, a plurality of driven gears of various diameters mounted on said driven shaft, said driven gears being suitable for engagement with said driver gear, a support rail, said motor being rotatably and slidably mounted on said support rail, whereby said driver gear may be selectively engaged and disengaged with any one of said driven gears, and said driven shaft may be rotated at various selected speeds, a plurality of actuator members connected to said driven shaft and extending therefrom, a plurality of beat-producing elements, and means for moving any one of said beat-producing elements in intermittent contact with a selected number of said actuator members, whereby a selected ratio of beats is obtained at selected rates of speed.

3. A multi-beat instrument in accordance with claim 2, comprising means for locking said driver gear in engagement with any one of said driven gears and for locking said driver gear in disengagement from any of said driven gears.

4. A multi-beat instrument in accordance with claim 2, wherein said actuator members are disposed in a plurality of annular series, said series being longitudinally spaced along said driven shaft, each of said series comprising at least one member, one member of each of said series lying on the same straight line, whereby when at least two of said beat-producing elements are placed in intermittent contact with separate series of said members at least two distinct series of beats is produced and said beats will be in synchronization once during each revolution of said driven shaft.

5. A multi-beat instrument, comprising a case, said case comprising a beat rate-of-speed control panel, and a beat ratio control panel; said rate-of-speed control panel having formed therein a horizontally disposed rate-of-speed neutral slot, and a plurality of rate-of-speed selection slots communicating with said rate-of-speed neutral slot; said ratio-control panel having formed therein a horizontally disposed ratio neutral slot, and a synchronization recess and a plurality of ratio-selection recesses all communicating with said ratio-neutral slot; a single-speed motor, said motor having a motor shaft, a driver gear driven by said motor shaft, a support rail carried by said case, said motor being rotatably and slidably mounted on said rail, a control arm connected to said motor for rotating and sliding said motor on said rail, said control arm being partially disposed in said rate-of-speed control panel slots and having a threaded end portion and a flat-sided intermediate portion for engaging the sides of said rate-of-speed selection slots, an internally threaded control knob disposed on said control arm, said control knob being movable longitudinally on said control arm, said control knob having a plurality of positions of tight contact with said control panel locking said motor in selected fixed positions, a rotatable driven shaft disposed substantially parallel to said support rail, a plurality of driven gears of various diameters mounted on said driven shaft and adapted to selectively mesh with said driver gear, whereby said rotatable shaft may be rotated at various speeds while said driver shaft rotates at a single fixed speed, a plurality of actuator arms connected to said driven shaft, said arms being disposed in a plurality of longitudinally spaced annular series, at least one of said series having one arm, a plurality of beat-producing elements, a separate ratio control arm connected to each of said elements and partially disposed in said ratio control panel slot and supported therein, said beat-producing elements being movable into intermittent contact with separate series of said arms, and a distinctive synchronization sounding element adapted to be moved into the path of the single-arm series, whereby said synchronization element will give a distinctive sound at the time of synchronization of the other beats.

6. A multi-beat instrument, comprising, in combination, a case, a horizontal cylindrical support rail in said case, an electric motor mounted upon said rail for rotary and sliding movement thereon, a control arm connected with said motor and extending through one of intercommunicating horizontal and vertical slots formed in said case for maintaining said motor in a selected position, a driver gear driven by said motor and movable therewith, a plurality of interconnected gears of different diameters extending parallel to each other and to said driver gear, said control arm being adapted by moving said motor to bring said driver gear into meshing engagement with any one of said interconnected gears, a cylindrical actuator operatively connected with said interconnected gears, actuator members mounted upon said actuator and arranged in a plurality of longitudinally spaced series, at least some of said series comprising a plurality of such actuator members, the actuator members of each of the last-mentioned series being spaced radially and located in the same transverse plane, a plurality of movable contact arms, each contact arm being adapted to be engaged by at least some of said series of actuator members, a separate signal-producing element cooperating with each contact arm for emitting a signal when its contact arm is engaged by an actuator member, a separate connecting arm carrying each signal-producing element and the contact arm cooperating therewith and extending with play through another horizontal slot formed in said case, whereby said contact arms may be lowered out of engagement with said actuator members, and separate means connected with each connecting arm for fixing it in a position in the last-mentioned slot wherein its signal-producing element is adapted to be engaged by one series of said actuator members.

References Cited in the file of this patent

UNITED STATES PATENTS

| 512,470 | Hanson | Jan. 9, 1894 |
| 1,571,110 | Ebert et al. | Jan. 26, 1926 |
| 2,184,728 | Aalberg | Dec. 26, 1936 |
| 2,541,143 | Zimmerman | Feb. 13, 1951 |
| 2,811,071 | Gorr | Oct. 29, 1957 |